Figure 1:
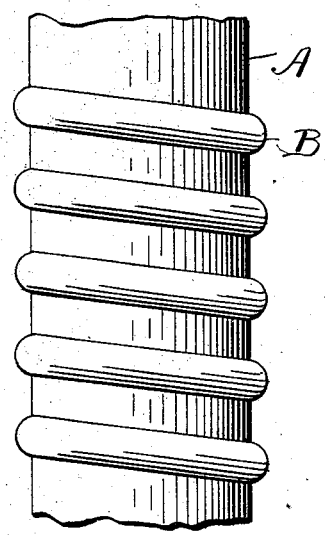

No. 726,730. PATENTED APR. 28, 1903.
J. F. McGUIRE.
WIRE COVERED HOSE.
APPLICATION FILED FEB. 17, 1902.
NO MODEL.

Witnesses
E. B. Gilchrist
F. D. Ammen

Inventor
John F. McGuire
by his attorneys
Thurston & Bates

UNITED STATES PATENT OFFICE.

JOHN F. McGUIRE, OF AKRON, OHIO, ASSIGNOR TO THE B. F. GOODRICH COMPANY, OF AKRON, OHIO, A CORPORATION OF OHIO.

WIRE-COVERED HOSE.

SPECIFICATION forming part of Letters Patent No. 726,730, dated April 28, 1903.

Application filed February 17, 1902. Serial No. 94,396. (No model.)

*To all whom it may concern:*

Be it known that I, JOHN F. McGUIRE, a citizen of the United States, residing at Akron, in the county of Summit and State of Ohio, have invented a certain new and useful Improvement in Wire-Covered Hose, of which the following is a full, clear, and exact description, reference being had to the accompanying drawings.

Wire-covered hose is used very extensively for conveying compressed air or steam to various kinds of tools operated thereby and which are adapted to be moved to different points or into different positions, as the condition may require. It has been found that in dragging the hose from place to place, as is necessary in shifting the tools from place to place, there is a tendency for the wire covering the hose to become caught upon projections or debris over which it may be drawn, and this tendency not only is a disadvantage to the manipulation of such hose in industrial operations, but if any considerable force be exerted upon the hose when it has been caught in this manner there is considerable danger of shifting the coils of the wire bodily upon the hose. Round wire has been used for covering hose; but this form is peculiarly attended with the disadvantages mentioned and involves also another incidental defect. If it is wound tightly enough upon the hose to prevent its being disturbed with relation to the hose, it will then cut into the hose when the same is subjected to the vary considerable pressure often obtained in practice.

The object of my invention is to meet and remedy this defect. This I do in two ways—by constructing the enveloping wire of a form not adapted to be readily engaged or caught by projections, &c., and by providing the wire with such a form on its inner side that it will be with difficulty disturbed or dislocated when once it has been placed about the hose. In other words, by a peculiar construction and form of the covering-wire, to be more fully described hereinafter, I minimize the probability of an opportunity occurring for dislocating the wire covering, and I provide means for preventing or resisting such a dislocation should such an opportunity occur. Flat bands have been used as a covering, and while bands of this form have the advantage of presenting a wide surface on the side toward the hose they are, if possible, even more poorly adapted to the operations incident to the work, as they are most readily caught by projections and debris.

The invention consists in the construction and combination of parts hereinafter described, and definitely set forth in the claims.

Figure 2:
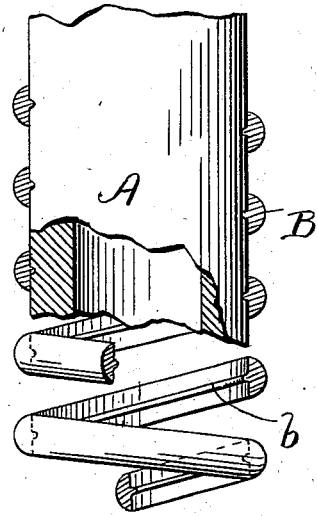
Figure 3:
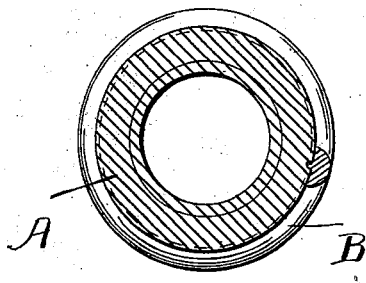
Figure 4:
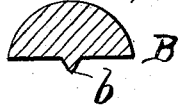

In the drawings, Figure 1 is a side elevation of a section of wire-covered hose embodying my invention. Fig. 2 is a side elevation in which a part of the wire and a part of the hose are in section. Fig. 3 is a sectional plan view of said hose. Fig. 4 is a transverse sectional view of the wire in its best form.

Referring to the parts by letters, A represents the hose, and B a metal strip or wire which is wound spirally upon the same. This wire is preferably substantially half-round in transverse section, wherefore the surface thereof which lies against the hose is substantially flat and the outer surface is inclined in both directions, so that both edges meet the hose in a thin edge. When this hose is being dragged along, these inclined edges will ride over any obstacles in their path instead of being caught thereby. They will likewise ride over the dirt instead of catching it, therefore requiring that it be dragged along with the hose. The broad flat surfaces engaging with the surface of the hose will prevent the wire from cutting into the hose and also because of the wide bearing-surface will in large measure prevent the wire from being shifted upon the hose. This last result, however, is attained with greater completeness by providing on the inner flat face of said wire a rib *b*, which may be continuous, as shown, or it may be broken or intermittent, as is also shown. This rib projects only a very short distance, and while it will be forced into the rubber a distance substantially equal to its height any greater penetration is prevented by the broad flat surfaces of the inner face of said wire.

Although, as heretofore stated, this sort of hose finds its greatest field of usefulness in connection with the transmission of compressed air and steam from place to place, it is nevertheless capable of being used and is to some extent used for conveying water or liquids.

Having described my invention, I claim—

1. A rubber hose combined with a wire wound spirally thereabout, said wire having a flat face adapted to contact with the outer surface of said hose and a small projecting bead carried by said flat face and pressed into the wall of said hose, substantially as and for the purpose specified.

2. A rubber hose, combined with a wire, wound spirally about the same having an inner flat face and an outer surface whose edges are inclined, and having, projecting from its inner flat face, a rib, substantially as and for the purpose specified.

3. A rubber hose combined with a wire wrapped helically thereabout, said wire having a flat face adapted to contact with the outer wall of said hose and having a bead located centrally of said flat face and extending continuously therewith, said bead being pressed into the outer wall of said hose, and said flat faces forming means to prevent the wire from cutting through the hose, substantially as and for the purpose specified.

4. The combination of a rubber hose, and a substantially half-round wire wound spirally upon the same with its flat face lying against said hose, and having projecting from its inner flat face a rib, substantially as and for the purpose specified.

In testimony whereof I hereunto affix my signature in the presence of two witnesses.

JOHN F. McGUIRE.

Witnesses:
W. J. O'NEIL,
SIDNEY E. SMITH.